(12) United States Patent
Kroeger et al.

(10) Patent No.: US 10,843,925 B1
(45) Date of Patent: Nov. 24, 2020

(54) PLASMA PROCESSES FOR PRODUCING GRAPHENE NANOSHEETS

(71) Applicant: RAYMOR INDUSTRIES INC., Boisbriand (CA)

(72) Inventors: Jens Kroeger, Montréal (CA); Nicholas Larouche, Montréal (CA); Frédéric Larouche, Ile Bizard (CA)

(73) Assignee: RAYMOR INDUSTRIES INC., Boisbriand (CA)

( * ) Notice: Subject to any disclaimer, the term of this patent is extended or adjusted under 35 U.S.C. 154(b) by 0 days.

(21) Appl. No.: 17/008,629

(22) Filed: Aug. 31, 2020

Related U.S. Application Data

(63) Continuation of application No. 16/472,065, filed as application No. PCT/CA2017/051545 on Dec. 20, 2017, now Pat. No. 10,793,440.

(Continued)

(51) Int. Cl.
*C01B 32/184* (2017.01)
*H05H 1/30* (2006.01)
(Continued)

(52) U.S. Cl.
CPC ............ *C01B 32/184* (2017.08); *H05H 1/30* (2013.01); *B82Y 30/00* (2013.01); *B82Y 40/00* (2013.01); *C01P 2004/24* (2013.01)

(58) Field of Classification Search
CPC . C01B 32/184; C01B 32/186; C01B 2204/30; C01B 32/182; C01B 32/198;
(Continued)

(56) References Cited

U.S. PATENT DOCUMENTS 8,486,363 B2 * 7/2013 Hung ............... C01B 32/184 423/448
8,486,364 B2 * 7/2013 Vanier ............... B82Y 30/00 423/448

(Continued)

FOREIGN PATENT DOCUMENTS

WO  2012147054  11/2012
WO  2013166414  11/2013

(Continued)

OTHER PUBLICATIONS

Kim et al., "Continuous Synthesis of Nanostructured Sheetlike Carbons by Thermal Plasma Decomposition of Methane", IEEE Transactions on Plasma Science, vol. 35, No. 2, Apr. 2007.

(Continued)

*Primary Examiner* — Daniel C. McCracken
(74) *Attorney, Agent, or Firm* — Bereskin & Parr LLP/S.E.N.C.R.L., s.r.l.

(57) ABSTRACT

Provided are plasma processes for producing graphene nanosheets comprising injecting into a thermal zone of a plasma a carbon-containing substance at a velocity of at least 60 m/s standard temperature and pressure STP to nucleate the graphene nanosheets, and quenching the graphene nanosheets with a quench gas of no more than 1000° C. The injecting of the carbon-containing substance may be carried out using a plurality of jets. The graphene nanosheets may have a Raman G/D ratio greater than or equal to 3 and a 2D/G ratio greater than or equal to 0.8, as measured using an incident laser wavelength of 514 nm. The graphene nanosheets may be produced at a rate of at least 80 g/h. The graphene nanosheets can have a polyaromatic hydrocarbon concentration of less than about 0.7% by weight.

25 Claims, 3 Drawing Sheets

Related U.S. Application Data (60) Provisional application No. 62/437,057, filed on Dec. 21, 2016, provisional application No. 62/512,520, filed on May 30, 2017.

(51) Int. Cl.
  *B82Y 40/00* (2011.01)
  *B82Y 30/00* (2011.01)

(58) Field of Classification Search
  CPC ............ C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/32; C01B 32/20; C01B 32/205; C01B 32/21; C01B 32/215; C01B 32/22; C01B 32/225; C01B 32/23; H05H 1/30; B82Y 30/00; B82Y 40/00; C01P 2004/24
  See application file for complete search history.

(56) References Cited

U.S. PATENT DOCUMENTS

| | | | |
|---|---|---|---|
| 2010/0072430 A1* | 3/2010 | Gergely | C01B 32/184 252/504 |
| 2013/0084236 A1* | 4/2013 | Hung | B82Y 30/00 423/448 |
| 2014/0170057 A1* | 6/2014 | Huang | B82Y 40/00 423/448 |
| 2017/0113935 A1* | 4/2017 | Pennington | H05H 1/46 |
| 2020/0223698 A1 | 7/2020 | Kroeger et al. | |

FOREIGN PATENT DOCUMENTS

| | | | | |
|---|---|---|---|---|
| WO | 2015189643 | | 12/2015 | |
| WO | WO 2015/189643 | * | 12/2015 | ............ C01B 31/04 |

OTHER PUBLICATIONS

Kim et al., "Size-Controllable and Low-Cost Fabrication of Graphene Quantum Dots Using Thermal Plasma Jet", American Chemical Society, vol. 8, No. 5, pp. 4190-4196, May 2014.

Lemmon et al., "Viscosity and Thermal Conductivity Equations for Nitrogen, Oxygen, Argon, and Air", International Journal of Thermophysics, vol. 25, No. 1, Jan. 2004.

Pristavita et al., "Carbon Nanoparticle Production by Inductively Coupled Thermal Plasmas: Controlling the Thermal History of Particle Nucleation", Plasma Chem Plasma Process, Sep. 2011, 31:851-866.

Pristavita et al., "Carbon Blacks Produced by Thermal Plasma: the Influence of the Reactor Geometry on the Product Morphology", Plasma Chem Plasma Process, Feb. 2010, 30:267-279.

Zhang et al., "Preparation of few-layer graphene nanosheets by radio-frequency induction thermal plasma", Carbon 86, Jan. 2015, 38-45.

Amirov et al., "Direct Synthesis of Porous Multilayer Graphene Materials Using Thermal Plasma at Low Pressure", Journal of Nanomaterials, Reaseach Article, vol. 2015 (April), Article ID 724508, 6 pages.

Brunauer et al., "Adsorption of Gases in Multimolecular Layers", Contribution from the Bureau of Chemistry and Soils and George Washington University, Feb. 1938, 309-319.

Wang et al., "Low-cost and large-scale synthesis of graphene nanosheets by arc discharge in air", Nanotechnology 21 (Apr. 1, 2010), pp. 1-4.

\* cited by examiner

PLASMA PROCESSES FOR PRODUCING GRAPHENE NANOSHEETS

CROSS-REFERENCE TO RELATED APPLICATIONS

The present application is a continuation of U.S. Ser. No. 16/472,065 filed on Jun. 20, 2019 that is a 35 USC 371 national stage entry of PCT/CA2017/051545 filed on Dec. 20, 2017 and which claims priority to U.S. 62/437,057 filed on Dec. 21, 2016 and to U.S. 62/512,520 filed on May 30, 2017. These documents are hereby incorporated by reference in their entirety.

FIELD OF THE DISCLOSURE

The present disclosure relates to the field of graphene production and more particularly to the production of graphene nanosheets using plasma processes, and to the production of graphene nanosheets having a reduced content in polyaromatic hydrocarbons (PAHs).

BACKGROUND OF THE DISCLOSURE

Graphene, a material consisting of a few layers or monolayers of sp-2 bonded carbon atoms arranged in a honeycomb lattice, is a material combining high surface area and electrical conductivity with good chemical inertness, as well as outstanding mechanical properties. These qualities render graphene an ideal material for batteries, super-capacitors and conductive ink applications. Graphene could replace graphite and carbon black used ubiquitously in battery electrodes. Graphene could also replace carbon black in car tires and wherever carbon black and carbon fibers are used in filler applications.

Commercially available graphene can be split into 3 categories: single-layer graphene from chemical vapour deposition (CVD) on a substrate, multi-layer graphene from graphite exfoliation and few-layer graphene nanosheets produced using a plasma torch. While CVD graphene possesses the qualities of true single-layer graphene, it will likely never be produced in quantities necessary for bulk applications. Exfoliated multi-layer graphene, while being available in bulk quantities suitable for energy storage, filler and conductive ink applications, does not possess the specifications or spectral signature of mono-layer graphene nor can it approach the electrical conductivity values expected for mono-layer graphene. Few-layer graphene nanosheets made from a plasma torch process can be produced in bulk quantities and with a signature (Raman spectra and specific surface area) similar to that of monolayer graphene.

It is highly desirable to produce bulk quantities of economical few-layer graphene with a signature (Raman spectra and specific surface area) similar to true monolayer graphene, at industrial scale (i.e. using a high power plasma torch).

Bottom-up methods for producing graphene by injecting a carbon feedstock into a plasma torch have been presented in the literature. However, in all cases they operated at low carbon feed rates or obtained poor graphitization. These publications do not teach operating parameters allowing to scale-up the production while maintaining a high graphene quality. For example, in U.S. Pat. No. 8,486,363 B2 and U.S. Pat. No. 8,486,364 B2, methods for producing graphenic carbon particles utilizing hydrocarbon precursor materials are described. U.S. Pat. No. 8,486,363 B2 describes a process producing graphenic carbon particles at a rate of 93.6 g/h. Patent application no. WO 2015189643 A1 discloses a method to produce graphenic particles at a rate of 100 g/h. Furthermore, several groups have synthesized graphene nanosheets by injecting hydrocarbons into an electric arc (Zhiyong et al., Zhang et al., Amirov et al). Bergeron, Lavoie as well as Pristavita et al. have used inductively coupled plasma to produce graphene nanoplatelets. Furthermore, all prior art is realized with low power plasma reactors (≤ 35 kW). The processes described herein allow to produce quality graphene nanosheets with high power plasma reactors (for example >35 kW), which generate excessive heat in the plasma afterglow. The processes disclosed herein also allow producing high quality graphene nanosheets at high throughput by dispersing and quenching the hydrocarbon gas adequately.

The production of graphene nanosheets by plasma processes are known to lead to the formation of polyaromatic hydrocarbons (PAHs) as a by-product (WO 2015189643 A1) Usually PAHs produced have a concentration in the range between 0.7 and 2% by weight. In such processes, PAHs form on the surface of the few-layer graphene nanosheets.

PAHs are undesired compounds present on carbon-based powders produced from the pyrolysis of gaseous hydrocarbon precursors or when a mixture of hydrogen precursor and carbon precursor are simultaneously present during the production of carbon-based powders. PAHs encompass many compounds composed primarily of carbon and hydrogen ($C_xH_y$) and where carbon is mostly arranged in aromatic ring configuration with $sp^2$ hybridization. PAHs can also contain small fractions of oxygen or nitrogen or other atoms. PAHs can be noxious and carcinogenic as well as pose a serious hazard to humans handling carbon nanoparticles containing PAHs as well as consumers using products that contain PAHs (See Borm P J, et. al., Formation of PAH-DNA adducts after in vivo and vitro exposure of rats and lung cells to different commercial carbon blacks, Toxicology and Applied Pharmacology, 2005 Jun. 1; 205(2): 157-167). As a consequence, regulations exist to limit the fraction of PAHs present in manufactured carbon powder (as an example, the EU directive 2007/19/EC establishes a maximum Benzo(a)pyrene content of 0.25 mg/kg in carbon black). Moreover, the presence of PAH on carbon surfaces can have detrimental effects on the performance in energy storage applications by blocking small pores and therefore by decreasing the specific surface area.

In addition, the Harmonized System (HS), established by the World Custom Organization (WCO), classifies many PAHs as Category 1B carcinogenic, mutagenic or reprotoxic (CMR) substances. Accordingly the new European REACH Annex XVII has limited the concentration of PAH in consumer products to 0.0001% by weight (or 1 mg/kg).

Wet chemistry processes to wash or rinse off PAHs from carbon particles are known. Such processes, such as Soxhlet extraction, generally require the use of toxic non-polar solvents such as toluene, since the solubility of PAHs is very limited. However, such processes involving toxic solvents lead to large amounts of waste formed by solvents contaminated with PAHs. Wet-chemistry PAH removal processes thus have a negative environmental impact and add a large cost to the PAH-free end product. It is thus highly desirable to develop a simple gas-phase (dry) method to remove PAHs from carbon nanoparticles and graphene nanosheets and especially plasma-grown graphene nanosheets that is also economical and does not involve solvent waste. The use of liquid-phase processes also leads to significant densification of the carbon powder once dried. Such higher density may be detrimental to further processing such as dispersion, for example. PAH-free graphene nanoplatelets grown using a plasma process have shown greater specific surface area, dispersability and present less health risks as compared to plasma-grown graphene nanoplatelets containing PAHs.

It is thus highly desirable to produce directly, using a plasma process, and without post-processing, graphene nanoplatelets containing very low levels of PAHs. Indeed, while it is possible to wash away PAHs using wet chemistry processes such as Soxhelet extraction, this adds much cost to the final PAH-free graphene material.

SUMMARY

There is provided herein in an aspect a plasma process for producing graphene nanosheets comprising:
injecting into a thermal zone of a plasma a carbon-containing substance at a velocity of at least 60 m/s standard temperature and pressure (STP) to nucleate the graphene nanosheets, and quenching the graphene nanosheets with a quench gas of no more than 1000° C.

In another aspect, there is provided herein a plasma process for producing graphene nanosheets comprising:
injecting into a thermal zone of a plasma a carbon-containing substance at a velocity of at least 60 m/s STP to nucleate the graphene nanosheets, and quenching the graphene nanosheets with a quench gas of no more than 1000° C., thereby producing the graphene nanosheets with a Raman G/D ratio greater than or equal to 3 and a 2D/G ratio greater than or equal to 0.8, as measured using an incident laser wavelength of 514 nm.

In a further aspect, there is provided herein a plasma process for producing graphene nanosheets, comprising:
injecting into a thermal zone of a plasma a carbon-containing substance at a velocity of at least 60 m/s STP and at a quench gas to carbon ratio of at least 75 standard liter per minute (slpm) of quench gas per mole of carbon injected per minute, thereby producing the graphene nanosheets.

In a further aspect, there is provided herein a plasma process for producing graphene nanosheets, comprising:
injecting into a thermal zone of a plasma a carbon-containing substance at a velocity of at least 60 m/s STP and at a quench gas to supplied plasma torch power ratio of at least 1.25 slpm of quench gas per kW of supplied plasma torch power, thereby producing the graphene nanosheets.

In yet another aspect, there is provided herein a plasma process for producing graphene nanosheets, comprising:
injecting into a thermal zone of a plasma a carbon-containing substance, the injecting of the carbon-containing substance being carried out using a plurality of jets at a velocity of at least 60 m/s STP and directed such that the injected carbon-containing substance is distributed radially about a torch axis and diluted before reaching a quench gas, thereby producing the graphene nanosheets with a Raman G/D ratio greater than or equal to 3 and a 2D/G ratio greater than or equal to 0.8 as measured using an incident laser wavelength of 514 nm.

Another aspect herein provided is a plasma process for producing graphene nanosheets, comprising:
injecting into a thermal zone of a plasma a carbon-containing substance at a velocity of at least 60 m/s STP and at a quench gas to supplied plasma torch power ratio of at least 1.25 slpm of quench gas per kW of supplied plasma torch power, thereby producing the graphene nanosheets at a rate of at least 120 g/h.

Another aspect herein provided is a plasma process for producing graphene nanosheets, comprising:
injecting into a thermal zone of a plasma a carbon-containing substance, the injecting of the carbon-containing substance being carried out using a plurality of jets at a velocity of at least 60 m/s STP and directed such that the injected carbon-containing substance is distributed radially about a torch axis and diluted before reaching a quench gas, thereby producing the graphene nanosheets at a rate of at least 120 g/h.

A further aspect herein provided is a plasma process for producing graphene nanosheets, comprising:
injecting into a thermal zone of a plasma a carbon-containing substance at a velocity of at least 60 m/s, thereby producing the graphene nanosheets at a rate of at least 2 g/kWh of supplied plasma torch power.

In a further aspect, there is provided herein a plasma process for producing graphene nanosheets, comprising:
injecting into a thermal zone of a plasma a carbon-containing substance at a velocity of at least 60 m/s and with a supplied plasma torch power greater than 35 kW, thereby producing the graphene nanosheets at a rate of at least 80 g/h.

In a further aspect, there is provided herein a plasma process for producing graphene nanosheets, comprising:
injecting into a thermal zone of a plasma natural gas or methane at a velocity of at least 60 m/s STP to nucleate the graphene nanosheets, and quenching the graphene nanosheets with a quench gas.

There is provided herein in an aspect a plasma process for producing graphene nanosheets comprising:
injecting into a thermal zone of a plasma a carbon-containing substance at a velocity of at least 60 m/s standard temperature and pressure (STP) to nucleate the graphene nanosheets, and quenching the graphene nanosheets with a quench gas of no more than 1000° C.,
wherein the graphene nanosheets have a polyaromatic hydrocarbon concentration of less than about 0.7% by weight.

In another aspect, there is provided herein a plasma process for producing graphene nanosheets comprising:
injecting into a thermal zone of a plasma a carbon-containing substance at a velocity of at least 60 m/s STP to nucleate the graphene nanosheets, and quenching the graphene nanosheets with a quench gas of no more than 1000° C., thereby producing the graphene nanosheets with a Raman G/D ratio greater than or equal to 3 and a 2D/G ratio greater than or equal to 0.8, as measured using an incident laser wavelength of 514 nm,
wherein the graphene nanosheets have a polyaromatic hydrocarbon concentration of less than about 0.7% by weight.

In a further aspect, there is provided herein a plasma process for producing graphene nanosheets, comprising:
injecting into a thermal zone of a plasma a carbon-containing substance at a velocity of at least 60 m/s STP and at a quench gas to carbon ratio of at least 75 standard liter per minute (slpm) of quench gas per mole of carbon injected per minute, thereby producing the graphene nanosheets,
wherein the graphene nanosheets have a polyaromatic hydrocarbon concentration of less than about 0.7% by weight.

In a further aspect, there is provided herein a plasma process for producing graphene nanosheets, comprising:
- injecting into a thermal zone of a plasma a carbon-containing substance at a velocity of at least 60 m/s STP and at a quench gas to supplied plasma torch power ratio of at least 1.25 slpm of quench gas per kW of supplied plasma torch power, thereby producing the graphene nanosheets,
- wherein the graphene nanosheets have a polyaromatic hydrocarbon concentration of less than about 0.7% by weight.

In yet another aspect, there is provided herein a plasma process for producing graphene nanosheets, comprising:
- injecting into a thermal zone of a plasma a carbon-containing substance, the injecting of the carbon-containing substance being carried out using a plurality of jets at a velocity of at least 60 m/s STP and directed such that the injected carbon-containing substance is distributed radially about a torch axis and diluted before reaching a quench gas, thereby producing the graphene nanosheets with a Raman G/D ratio greater than or equal to 3 and a 2D/G ratio greater than or equal to 0.8 as measured using an incident laser wavelength of 514 nm,
- wherein the graphene nanosheets have a polyaromatic hydrocarbon concentration of less than about 0.7% by weight.

Another aspect herein provided is a plasma process for producing graphene nanosheets, comprising:
- injecting into a thermal zone of a plasma a carbon-containing substance at a velocity of at least 60 m/s STP and at a quench gas to supplied plasma torch power ratio of at least 1.25 slpm of quench gas per kW of supplied plasma torch power, thereby producing the graphene nanosheets at a rate of at least 120 g/h,
- wherein the graphene nanosheets have a polyaromatic hydrocarbon concentration of less than about 0.7% by weight.

Another aspect herein provided is a plasma process for producing graphene nanosheets, comprising:
- injecting into a thermal zone of a plasma a carbon-containing substance, the injecting of the carbon-containing substance being carried out using a plurality of jets at a velocity of at least 60 m/s STP and directed such that the injected carbon-containing substance is distributed radially about a torch axis and diluted before reaching a quench gas, thereby producing the graphene nanosheets at a rate of at least 120 g/h,
- wherein the graphene nanosheets have a polyaromatic hydrocarbon concentration of less than about 0.7% by weight.

A further aspect herein provided is a plasma process for producing graphene nanosheets, comprising:
- injecting into a thermal zone of a plasma a carbon-containing substance at a velocity of at least 60 m/s, thereby producing the graphene nanosheets at a rate of at least 2 g/kWh of supplied plasma torch power,
- wherein the graphene nanosheets have a polyaromatic hydrocarbon concentration of less than about 0.7% by weight.

In a further aspect, there is provided herein a plasma process for producing graphene nanosheets, comprising:
- injecting into a thermal zone of a plasma a carbon-containing substance at a velocity of at least 60 m/s and with a supplied plasma torch power greater than 35 kW, thereby producing the graphene nanosheets at a rate of at least 80 g/h,
- wherein the graphene nanosheets have a polyaromatic hydrocarbon concentration of less than about 0.7% by weight.

In a further aspect, there is provided herein a plasma process for producing graphene nanosheets, comprising:
- injecting into a thermal zone of a plasma natural gas or methane at a velocity of at least 60 m/s STP to nucleate the graphene nanosheets, and quenching the graphene nanosheets with a quench gas,
- wherein the graphene nanosheets have a polyaromatic hydrocarbon concentration of less than about 0.7% by weight.

It has been found that the processes disclosed herein also allow producing high quality graphene nanosheets that have very low PAH content and are safe to handle and to integrate into end-user applications. It also has been found that the processes described herein are effective for increasing the production rate of graphene in a plasma process, thus allowing for economical and large-scale production. For example, it has been found that the production rate can be increased by raising the feed rate of the carbon-containing substance and by simultaneously adapting the design of the nozzle injector. It has also been found that the processes described herein are effective for producing graphene nanosheets with decreased concentrations of polyaromatic-hydrocarbons.

BRIEF DESCRIPTION OF THE DRAWINGS

In the following drawings, which represent by way of example only, various embodiments of the disclosure.

DETAILED DESCRIPTION OF THE DISCLOSURE

The expression "graphene nanosheets" as used herein refers to crumpled graphene nanosheets having structures comprising one or more stacked layers of one-atom-thick sheets of $sp^2$-bonded carbon atoms arranged in a honeycomb lattice. A least a portion of these stacked sheets are curled, curved or buckled, giving them a 3D morphology. Such particles are also known as graphene nanoplatelets (GNP), graphene nanoflakes, crumpled graphene, few-layer graphene, graphenic carbon particles or simply graphene. For example, graphene nanosheets can refer to particles composed of 10 layers or less and displaying high B.E.T. specific surface area (250 m$^2$/g) as measured by ASTM D 3663-78 standard (Brunauer et al). The particles have a thickness ranging between 0.5-10 nm and widths typically greater than or equal to 50 nm, and thus display a high aspect ratio of at least 5:1 but typically greater or equal than 10:1. The particles, when analyzed using Raman spectroscopy with an incident laser wavelength of 514 nm, display the typical D, G and 2D bands (located at about 1350 cm$^{-1}$, 1580 cm$^{-1}$ 2690 cm$^{-1}$ respectively) and a G/D ratio greater or equal than 3 (G/D≥3) as well as a 2D/G ratio greater or equal than 0.8 (2D/G≥0.8). As used herein, the G/D and 2D/G ratios refer to the ratios of the peak intensity of these bands.

The expression "aspect ratio" as used herein refers to the ratio of the longest dimension of the graphene particle to the shortest dimension of the graphene particle. For example, a graphene particle having an average width of 100 nm and an average thickness of 2 nm has an aspect ratio of 50:1.

The expression "polyaromatic hydrocarbon", "PAH" or "PAHs" as used herein refers to a group of chemicals that are formed during the incomplete burning of coal, oil, gas, wood, garbage, or other organic substances, such as tobacco and charbroiled meat. There are more than 100 different PAHs. PAHs generally occur as complex mixtures (for example, as part of combustion products such as soot), not as single compounds. They can also be found in substances such as for example crude oil, coal, coal tar pitch, creosote, and roofing tar. The list of PAHs includes but is not limited to Biphenylene, Acenaphthylene, Phenanthrene, Anthracene, Fluoranthene, Pyrene, Xylenes, Napthalene, Benzo(A) Pyrene (BaP), Benzo[E]pyrene (BeP), Benzo[a]anthracene (BaA), Chrysen (CHR), Benzo[b]fluoranthene (BbFA), Benzo[j]fluoranthene (BjFA), Benzo[k]fluoranthene (BkFA), and Dibenzo[a,h]anthracene (DBAhA).

The concentration of polyaromatic hydrocarbons in a graphene sample can be determined quantitatively for example by Soxhlet extraction in toluene, followed by analysis using gas chromatography mass spectrometry (GC/MS), as is common for the quantification of Benzo-α-Pyrene (BaP) in carbon black samples. A standard method to quantify polyaromatic hydrocarbons in carbon samples is described by the standard ASTM D7771-17, "Standard Test Method for Determination of Benzo-α-Pyrene (BaP) Content in Carbon Black". While this standard focuses on Benzo-α-Pyrene (BaP), the measurement method can be used for other compounds of the PAH family. Our concentration in percent PAHs reported is the sum of all detected PAHs. Our Soxhlet extractions were typically only about 4-6 hours compared with 16 hours for the ASTM standard. The Soxhlet was set up for high efficiency extraction with rapid fill/drain cycles. The eluent was colorless prior to the extraction being terminated. The extract was not concentrated but analyzed directly by GC/MS and compared with commercially available standard PAH mixtures. The detection limit of this method is of the order of 35-90 ppm PAH (0.0035-0.0090% PAH by weight).

The expression "carbon-containing substance" as used herein refers to a compound or substance that comprises at least one carbon atom.

The expression "thermal zone" as used herein refers to a thermal zone that can be generated for example by a quasi-thermal plasma, for example, a plasma that is close to local thermodynamic equilibrium (LTE), formed by, for example, an inductively coupled plasma torch (ICP), a direct-current plasma torch (DC-plasma), an alternative-current plasma (AC-plasma) or a microwave plasma torch or any other suitable way to generate a hot gas in the plasma state. A plasma is close to LTE at high pressure (typically over 100 torr), where collisions between electrons, ions, neutrals and radicals are frequent.

The term "supplied plasma torch power" as used herein refers to the power supplied to the plasma torch. The supplied power is greater than or equal to the power in the plasma as plasma torches are not 100 percent efficient at transferring the supplied power to the plasma gas.

The term "quench gas to carbon ratio" as used herein refers to the volume per unit of time of quench gas, for example standard liter per minute (slpm) of gas injected, for the volume per unit of time (for example slpm) of a carbon-containing substance, for example a carbon-containing gas injected. The term "quench gas to carbon ratio" as used herein also refers to the volume per unit of time of quench gas to the number of moles of carbon injected (1 mole of carbon is equal to 12 grams of carbon). The "quench gas to carbon ratio" as used herein also refers to the mass per unit of time (for example gram per second or gram per minute) of quench gas injected into the reactor to the mass per unit of time (for example gram per second or gram per minute) of a carbon-containing substance.

As used herein, the term "quench gas" refers to and can comprise any non-carbon containing gas with a high thermal conductivity at STP greater than or equal to 17.9 milli-Watt per meter per degree Kelvin (the thermal conductivity of Argon at STP; see E. W. Lemmon and R. T Jacobsen). The quench gas may for example be composed of argon, helium, hydrogen, nitrogen or any other gas with a thermal conductivity greater than or equal to 17.9 mW/m·K, or any mixture of these gases. A person skilled in the art will understand that the thermal conductivity of the gas is determinant for the quench rate of the reactants. The quench gas will typically be injected close to or inside the plasma torch but can be injected elsewhere in the reactor as well as in multiple layers or multiple locations. As used herein, the "quench gas" also refers to a sheath gas injected next to the plasma gas in a RF-plasma or DC-plasma torch and used to protect the torch components from thermal shock and degradation (see FIGS. 4 and 5).

As used herein, all gas volumes and velocities are, unless specified otherwise, meant to denote quantities at standard temperature and pressure (STP). The person skilled in the art will readily understand that these values change at high temperature and high pressure experienced in the plasma torch.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used herein, the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

Accordingly, the present disclosure relates to the production of graphene nanosheets whose structure resembles that of monolayer graphene. The presently disclosed processes allow producing few-layer graphene with a signature (Raman spectra and specific surface area) similar to true monolayer graphene, at industrial scale. The graphene nanosheets resulting from the processes presently disclosed feature a Raman 2D/G ratio greater than or equal to 0.8 (when measured using an incident laser with a wavelength of 514 nm) and a specific surface area (BET) of 250 m²/g or greater. This Raman signature, displayed by CVD graphene, demonstrates that the graphene is composed of very few layers (for example 4-7). Furthermore, the wavy morphology of graphene produced with plasma allows dispersing the graphene in a variety of solvents and resins, and avoids the re-stacking of the layers.

The present disclosure describes processes to obtain, at industrial scale, high quality graphene nanosheets using a plasma torch process. The formation of graphene nanosheets in a plasma torch process undergoes 3 distinct stages: (a) the decomposition of the carbon precursor gas in the hot zone, followed, upon cooling by (b) the formation of graphene nuclei, and (c) nuclei growth into few-layers graphene sheets.

Depending on the temperature profile experienced during stages (a) and (b), there are 3 competitive reaction paths yielding different types of nanostructures. These paths are (1) the polyaromatic hydrocarbon (PAH) path around 1600° C. and yielding furnace black type particles, where the PAH originate from acetylene precursors; (2) the acetylene path around 2600° C. and yielding acetylene black type particles; and (3) the $C_2$ radical path at higher temperatures, yielding the desired crumpled sheet-like morphology. To increase the selectivity towards the desired sheet-like morphology, one must avoid the PAH and the acetylene paths, and therefore avoid the formation of active acetylene formed during the cooling of the $C_2$ radicals in presence of reactive hydrogen at temperature between 2000° C. to 4000° C. This may be achieved by providing a steep temperature gradient between the hot thermal zone (e.g. >4000° C.) and the cold gas (sheath) region (e.g. <1000° C.). In the presently disclosed processes, this steep gradient experienced by the reactants may be amplified by the use of an injector nozzle and by adequately choosing the composition and flow rate of the quench gas (sheath gas). The injector nozzle confers a high injection velocity to the hydrocarbon gas and directs the flow radially (with respect to the torch axis) through the steepest temperature gradient, such that the nucleated particles travel the smallest distance before reaching the cold gas front. The injector nozzle also dilutes the hydrocarbon gas in order to prevent the nucleating graphene nanosheets from interacting with each other. The injection design described herein, as well as improved quenching conditions, allow obtaining high through-put production of the desired high quality material, for example by increasing the hydrocarbon feed rate.

In addition, the present disclosure describes the operating parameters, in particular regarding hydrocarbon injection, to produce high quality graphene at a high production rate (for example at least 225 g/h), thus realizing a commercially viable process.

For example, the graphene nanosheets are quenched with a quench gas having a temperature below 1300° C.

For example, the graphene nanosheets are quenched with a quench gas having a temperature below 900° C.

For example, the graphene nanosheets are quenched with a quench gas having a temperature below 600° C.

For example, the graphene nanosheets are quenched with a quench gas having a temperature below 300° C.

For example, the graphene nanosheets are quenched with a quench gas having a temperature below 100° C.

For example, the carbon-containing substance is injected at a quench gas to carbon ratio of at least 50 slpm of quench gas per mole of carbon per minute.

For example, the carbon-containing substance is injected at a quench gas to carbon ratio of at least 100 slpm of quench gas per mole of carbon per minute.

For example, the carbon-containing substance is injected at a quench gas to carbon ratio of at least 150 slpm of quench gas per mole of carbon per minute.

For example, the carbon-containing substance is injected at a quench gas to carbon ratio of at least 160 slpm of quench gas per mole of carbon per minute.

For example, the carbon-containing substance is injected at a quench gas to carbon ratio of at least 250 slpm of quench gas per mole of carbon per minute.

For example, the carbon-containing substance is injected at a quench gas to carbon ratio of about 50 slpm to about 125 slpm of quench gas per mole of carbon per minute.

For example, the carbon-containing substance is injected at a quench gas to carbon ratio of about 100 slpm to about 160 slpm of the quench gas per mole of carbon per minute.

For example, the carbon-containing substance is injected at a quench gas to carbon ratio of about 100 slpm to about 250 slpm of the quench gas per mole of carbon per minute.

For example, the injecting of the carbon-containing substance is carried out using a plurality of jets.

For example, the injecting of the carbon-containing substance is carried out using at least 2 jets.

For example, the injecting of the carbon-containing substance is carried out using at least 3 jets.

For example, the injecting of the carbon-containing substance is carried out using at least 4 jets.

For example, the injecting of the carbon-containing substance is carried out using at least 5 jets.

For example, the injecting of the carbon-containing substance is carried out using more than 5 jets.

For example, the graphene nanosheets are produced at a rate of at least 120 g/h.

For example, the graphene nanosheets are produced at a rate of at least 150 g/h.

For example, the graphene nanosheets are produced at a rate of at least 200 g/h.

For example, the graphene nanosheets are produced at a rate of at least 250 g/h.

For example, the graphene nanosheets are produced at a rate of about 120 to about 150 g/h.

For example, the graphene nanosheets are produced at a rate of about 150 to about 250 g/h.

For example, the graphene nanosheets are quenched with a quench gas fed at a rate of at least 3 slpm of the quench gas per kW of supplied torch power.

For example, the graphene nanosheets are quenched with a quench gas fed at a rate of at least 1 slpm of the quench gas per kW of supplied torch power.

For example, the graphene nanosheets are quenched with a quench gas fed at a rate of at least 0.5 slpm of the quench gas per kW of supplied torch power.

For example, the graphene nanosheets are quenched with a quench gas fed at a rate of about 0.5 slpm to about 1.5 slpm of the quench gas per kW of supplied torch power.

For example, the graphene nanosheets are quenched with a quench gas fed at a rate of about 1.5 slpm to about 4 slpm of the quench gas per kW of supplied torch power.

For example, the graphene nanosheets are produced at a rate of at least 1 g/kWh of supplied plasma torch power.

For example, the graphene nanosheets are produced at a rate of at least 2.5 g/kWh of supplied plasma torch power.

For example, the graphene nanosheets are produced at a rate of at least 3 g/kWh of supplied plasma torch power.

For example, the graphene nanosheets are produced at a rate of at least 5 g/kWh of supplied plasma torch power.

For example, the graphene nanosheets are produced at a rate of about 2 to about 3 g/kWh of supplied plasma torch power.

For example, the graphene nanosheets are produced at a rate of about 3 to about 5 g/kWh of supplied plasma torch power.

For example, the carbon-containing substance is a hydrocarbon precursor.

For example, the carbon-containing substance is chosen from methane, n-propanol, ethane, ethylene, acetylene, vinyl chloride, 1,2-dichloroethane, allyl alcohol, propionaldehyde, and/or vinyl bromide.

For example, the carbon-containing substance is a carbon-containing gas.

For example, the carbon-containing gas is a natural gas. The term "natural gas" as used herein refers to a naturally-occurring mixture of hydrocarbon and nonhydrocarbon gases found in porous geologic formations beneath the earth's surface. The principal constituent of natural gas is methane. It be understood that the content of natural gas will vary according the location from which it is sourced.

For example, the carbon-containing gas is a $C_1$-$C_4$ hydrocarbon.

For example, the carbon-containing gas is a $C_1$-$C_4$ hydrocarbon such as methane, ethane, ethylene, acetylene, propane, vinyl chloride propane, propene, cyclopropane, allene, propyne, butane, 2-methylpropane, 1-butene, 2-butene, 2-methylpropene, cyclobutane, methylcyclopropane, 1-butyne, 2-butyne, cyclobutene, 1,2-butadiene, 1,3-butadiene or 1-buten-3-yne or a mixture thereof.

For example, the carbon-containing substance is methane or natural gas.

The carbon-containing substance is not limited to a carbon-containing gas and also includes a carbon-containing liquid and a carbon-containing solid. It is also possible to use a mixture of a carbon-containing gas and a carbon-containing liquid, a mixture of a carbon-containing gas and a carbon-containing solid, a mixture of a carbon-containing liquid and a carbon-containing solid or a mixture of a carbon-containing gas, a carbon-containing liquid and a carbon-containing solid.

For example, the carbon-containing substance is a carbon-containing liquid.

For example, the carbon-containing liquid is a $C_5$-$C_{10}$ hydrocarbon.

For example, the carbon-containing liquid is chosen from n-propanol, 1,2-dichloroethane, allyl alcohol, propionaldehyde, vinyl bromide, pentane, hexane, cyclohexane, heptane, benzene, toluene, xylene or styrene or mixtures thereof.

For example, the carbon-containing substance is a carbon-containing solid.

For example, the carbon-containing solid is chosen from graphite, carbon black, norbornylene, naphthalene, anthracene, phenanthrene, polyethylene, polypropylene, or polystyrene or mixtures thereof. The carbon-containing solid can be for example in the form of a nanopowder.

For example, the carbon-containing gas, carbon-containing liquid or carbon-containing solid is in admixture with a carrier gas.

For example, the carrier gas comprises an inert gas.

For example, the inert gas is chosen from argon, helium, nitrogen, hydrogen or a mixture thereof.

For example, the quench gas is chosen from argon, helium, nitrogen, hydrogen or a mixture thereof.

For example, the quench gas comprises an inert gas.

For example, the quench gas comprises hydrogen.

For example, the quench gas comprises argon.

For example, the quench gas is fed at a rate of 1 to 10 slpm of gas for each kW of supplied plasma torch power.

For example, the thermal zone has a temperature of about 4000° C. to about 11 000° C.

For example, the thermal zone has a temperature of about 3000° C. to about 8000° C.

For example, the thermal zone has a temperature of about 2600° C. to about 5000° C.

For example, the carbon-containing substance is injected at a velocity of at least 70 m/s STP.

For example, the carbon-containing substance is injected at a velocity of at least 90 m/s STP.

For example, the carbon-containing substance is injected at a velocity of at least 100 m/s STP.

For example, the carbon-containing substance is injected at a velocity of about 60 to about 100 m/s STP.

For example, the carbon-containing substance is injected at a velocity of about 70 to about 90 m/s STP.

For example, the carbon-containing substance is injected at a velocity of about 75 to about 85 m/s STP.

For example, the quench gas is injected around the thermal zone.

For example, the process further comprises collecting the produced graphene nanosheets.

For example, the produced graphene nanosheets are collected in bag filters, on filter cartridges, with a cyclone, or other device used by someone skilled in the art of powder processing.

For example, the graphene nanosheets have a B.E.T. specific surface area greater or equal than 250 $m^2$/g as measured by ASTM D 3663-78.

For example, the graphene nanosheets have an aspect ratio of at least 5:1.

For example, the graphene nanosheets have an aspect ratio of at least 10:1.

For example, the graphene nanosheets have a Raman G/D ratio of at least 3, as measured using an incident laser wavelength of 514 nm.

For example, the graphene nanosheets have a Raman 2D/G ratio of at least 0.8, as measured using incident laser wavelength of 514 nm.

For example, the supplied plasma torch power is greater than 35 kW.

For example, the supplied plasma torch power is greater than 100 kW.

For example, the supplied plasma torch power is greater than 200 kW.

For example, the supplied plasma torch power is greater than 1000 kW.

For example, the graphene nanosheets have a polyaromatic hydrocarbon concentration of less than about 0.6% by weight.

For example, the graphene nanosheets have a polyaromatic hydrocarbon concentration of less than about 0.5% by weight.

For example, the graphene nanosheets have a polyaromatic hydrocarbon concentration of less than about 0.4% by weight.

For example, the graphene nanosheets have a polyaromatic hydrocarbon concentration of less than about 0.3% by weight.

For example, the graphene nanosheets have a polyaromatic hydrocarbon concentration of less than about 0.2% by weight.

For example, the graphene nanosheets have a polyaromatic hydrocarbon concentration of less than about 0.1% by weight.

For example, the graphene nanosheets have a polyaromatic hydrocarbon concentration of less than about 0.01% by weight.

For example, the graphene nanosheets have a polyaromatic hydrocarbon concentration of about 0.01% to less than about 0.7% by weight.

For example, the graphene nanosheets have a polyaromatic hydrocarbon concentration of about 0.01% to less than about 0.5% by weight.

For example, the graphene nanosheets have a polyaromatic hydrocarbon concentration of about 0.01% to less than about 0.3% by weight.

For example, the graphene nanosheets have a polyaromatic hydrocarbon concentration of about 0.1% to less than about 0.3% by weight.

For example, the graphene nanosheets have a polyaromatic hydrocarbon concentration of about 0.15% to less than about 0.25% by weight.

For example, the graphene nanosheets have a polyaromatic hydrocarbon concentration of about 0.01% to about 0.7% by weight.

For example, the graphene nanosheets have a polyaromatic hydrocarbon concentration of about 0.1% to about 0.6% by weight.

For example, the graphene nanosheets have a polyaromatic hydrocarbon concentration of about 0.05% to about 0.6% by weight.

For example, the graphene nanosheets have a polyaromatic hydrocarbon concentration of about 0.01% to about 0.5% by weight.

For example, the graphene nanosheets have a polyaromatic hydrocarbon concentration of about 0.05% to about 0.5% by weight.

For example, the graphene nanosheets have a polyaromatic hydrocarbon concentration of about 0.1% to about 0.5% by weight.

For example, the graphene nanosheets have a polyaromatic hydrocarbon concentration of about 0.01% to about 0.4% by weight.

For example, the graphene nanosheets have a polyaromatic hydrocarbon concentration of about 0.05% to about 0.4% by weight.

For example, the graphene nanosheets have a polyaromatic hydrocarbon concentration of about 0.1% to about 0.4% by weight.

For example, the graphene nanosheets have a polyaromatic hydrocarbon concentration of about 0.01% to about 0.3% by weight.

For example, the graphene nanosheets have a polyaromatic hydrocarbon concentration of about 0.05% to about 0.3% by weight.

For example, the graphene nanosheets have a polyaromatic hydrocarbon concentration of about 0.1% to about 0.3% by weight.

For example, the graphene nanosheets have a polyaromatic hydrocarbon concentration of about 0.15% to about 0.25% by weight.

For example, the graphene nanosheets have a polyaromatic hydrocarbon concentration of less than about 500 ppm.

For example, the graphene nanosheets have a polyaromatic hydrocarbon concentration of less than about 400 ppm.

For example, the graphene nanosheets have a polyaromatic hydrocarbon concentration of less than about 300 ppm.

For example, the graphene nanosheets have a polyaromatic hydrocarbon concentration of less than about 200 ppm.

For example, the graphene nanosheets have a polyaromatic hydrocarbon concentration of less than about 100 ppm.

For example, the graphene nanosheets have a polyaromatic hydrocarbon concentration below detection limit, as measured by gas chromatography mass spectrometry (GC/MS) or by Soxhlet extraction method according to ASTM D7771-11.

For example, the process can be carried an injection angle of the carbon-containing substance that is about 10 to about 40, about 20 to about 30 degrees or about 25 degrees with respect to the axis of symmetry of the plasma.

For example, the process can be carried an injection angle of the carbon-containing substance that is about 15 to about 35, about 20 to about 30 degrees or about 25 degrees with respect to the axis of symmetry of the plasma.

For example, the process can be carried out using a plasma torch comprising multi-hole injector for injecting the carbon-containing substance, wherein for each of injector holes, injection velocity is at least 60 m/s STP and injection angle is about 15 to about 35 degrees with respect to the axis of symmetry of the plasma.

For example, the process can be carried out using a plasma torch comprising multi-hole injector for injecting the carbon-containing substance, wherein for each of injector holes, injection velocity is at least 60 m/s STP and injection angle is about 20 to about 30 degrees with respect to the axis of symmetry of the plasma.

For example, the process can be carried out using a plasma torch comprising multi-hole injector for injecting the carbon-containing substance, wherein for each of injector holes, injection velocity is at least 60 m/s STP and injection angle is about 25 degrees with respect to the axis of symmetry of the plasma.

For example, in accordance with embodiments of the present invention, the thermally produced graphenic carbon particles may be produced by systems and methods as disclosed in U.S. Pat. Nos. 8,486,363, 8,486,364 and 9,221,688, which are incorporated herein by reference.

The following examples are non-limitative and are used to better exemplify the materials and processes of the present disclosure.

EXAMPLES

Example 1

Figure 4:
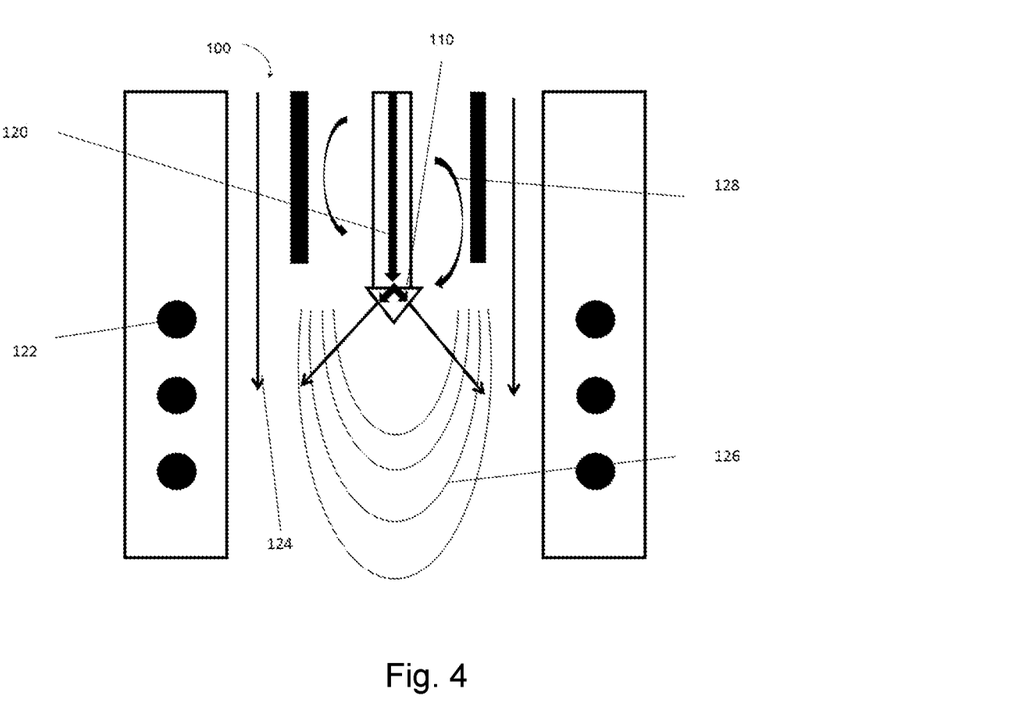
FIG. 4 shows the plasma torch with a multi-hole injector used in example 1 and the qualitative flow of the gases including the non-carbon containing gases and the carbon containing substance.

In one exemplary embodiment, the hydrocarbon precursor material is methane and it is injected into an inductively-coupled plasma torch (ICP) with a maximal plate power of 60 kW. FIG. 4 illustrates the ICP torch 100 as well as the qualitative flow of the gases including the non-carbon containing gases and the carbon containing substance.

For a power generator delivering 56 kW to an inductively coupled plasma torch (PN-50 model, Tekna, Sherbrooke, Quebec, Canada), and as shown in FIG. 4, 20 slpm argon was used as central swirl gas 128, surrounded by a layer of quench gas (sheath gas) 124 consisting of 174 slpm of argon and 30 slpm of hydrogen gas. 33.6 slpm of natural gas (carbon feed gas) 120 was injected through the injector probe with the designed nozzle 110. Coils 122 conducting the radio frequency alternating current generate the plasma. Qualitative isotherm lines 126 are shown inside the plasma torch. The pressure in the reactor was 500 torr. The injection velocity was 80.6 m/s at standard temperature and pressure (STP). It is to be understood that in the plasma state of extreme temperature and pressure, these gas injection velocities are greater and the value must be corrected to take the different temperature and pressure values into consideration. A person skilled in the art will understand that this injection velocity value will increase when the process is scaled, for example for larger plasma volumes or larger plasma torch dimensions.

This process lasted 45 minutes and resulted in a graphene production rate of 225 g/h as measured from the weight of powder harvested downstream of the hot plasma zone, divided by the operation time needed to synthesize this powder.

The carbon injected is 33.6 slpm/22.4 l=1.5 Mole/min or 18 g/min of carbon.

The quench gas to carbon ratio is at least 120 liters STP of non-carbon gases to 1 Mole of carbon (also at least 180 slpm of non-carbon gases to 18 g/min of carbon; 10.0 liters of non-carbon gas for 1 g of carbon in gas form).

The carbon injected per amount of power is typically 33.6 slpm for a delivered torch power of 56 kW which equals 0.6 slpm C/kW of torch power.

Figure 1A:
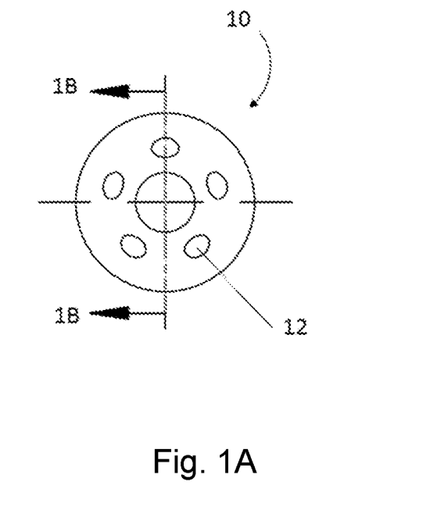
FIG. 1A (bottom view) and FIG. 1B (cross sectional view taken along the line 1B-1B of FIG. 1A) show a five (5)-hole shower head-type nozzle used to inject the carbon-containing substance.
Figure 1B:
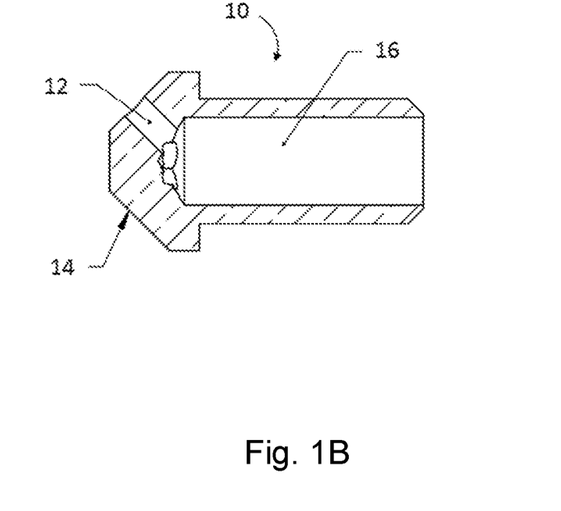

Now referring to FIGS. 1A and 1B, the injector used is a multi-hole nozzle 10 comprising five injection holes 12, each hole having a 0.052 inch diameter. The nozzle 10 comprises a channel 16 for hydrocarbon feed and the surface of the nozzle 14 is perpendicular to the injection holes 12. This configuration provides an injection velocity of 80.6 m/s STP. The carbon gas injection angle is 25 degrees with respect to the axis of symmetry of the plasma. A person skilled in the art will understand that a water-cooled injection nozzle will provide longer wear resistance and enable long duration production runs with stable operating conditions.

Figure 2:
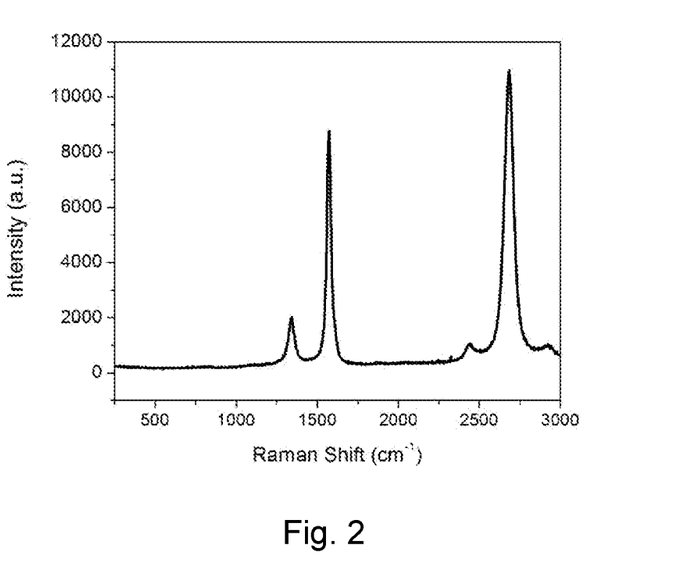
FIG. 2 is a plot of a Raman spectra obtained with an incident wavelength of 514 nm from a sample produced using a multi-hole injector where, for each of these injector holes, the injection velocity was greater or equal than 60 m/s STP (standard temperature and pressure) and the injection angle is 25 degrees with respect to the axis of symmetry of the plasma.

The resulting product was high quality graphene nanosheets, as seen from the Raman spectra (as shown in FIG. 2). The Raman spectrum of the product features a 2D/G ratio of 1.3 and a G/D ratio of 4.7 when measured using an incident wavelength of 514 nm. The graphene nanosheets produced using these parameters contained 0.16 percent by weight of polyaromatic hydrocarbons (PAH) (as measured by Soxhlet extraction with toluene) and typically between 0.15 and 0.25 percent by weight PAH. The B.E.T. specific surface area of the graphene nanoplatelets was 302 m$^2$/g. The specific surface area of the material (using the B.E.T. method), once PAH are removed using the heat treatment described in the provisional patent application U.S. 62/457,472, is 431 m$^2$/g.

The carbon precursor is injected at high velocity of at least 60 m/s STP, typically 80 m/s STP, and even 100 m/s STP in order to limit residence time in the hot zone. This may be achieved by injecting a gas material, for example natural gas, through a showerhead-type nozzle with small holes, at an injection velocity that is greater than or equal to the velocity of the plasma gas. A high feed rate coupled to small holes leads to a high injection velocity and a short residence time in the hot zone.

Example 2: Counter Example

Figure 3:
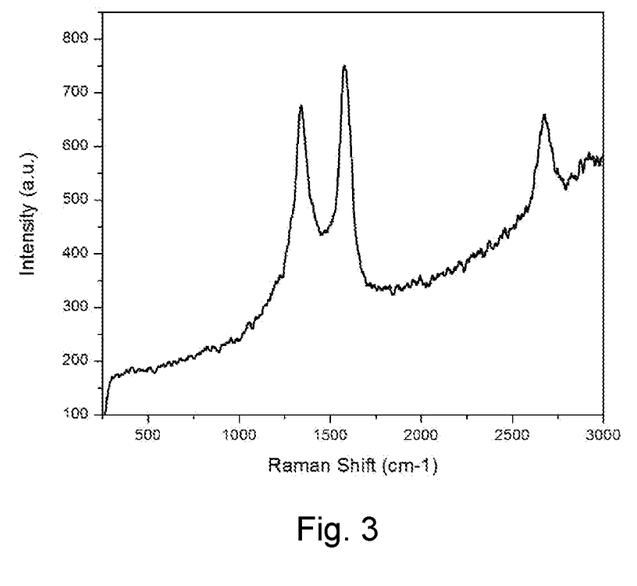
FIG. 3 is a plot of Raman spectra obtained with an incident wavelength of 514 nm from a sample produced using a single-hole injector and lower injection velocity (less than 60 m/s STP).
Figure 5:
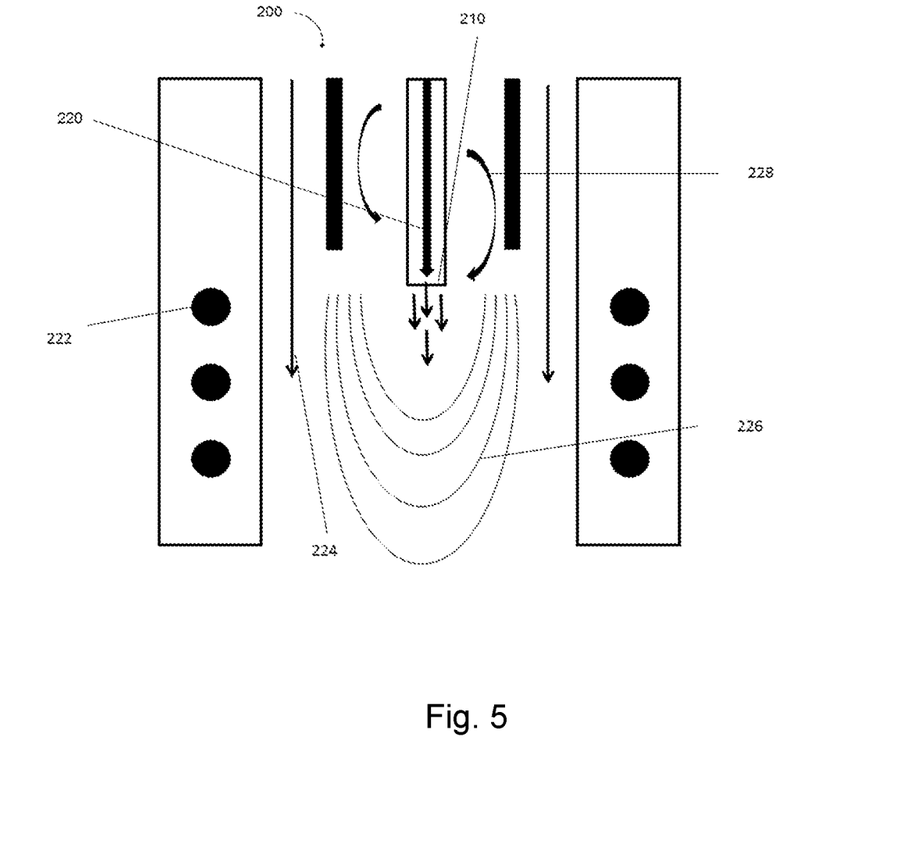
FIG. 5 shows the plasma torch with a single-hole injector used in example 2 and the qualitative flow of the gases including the non-carbon containing gases and the carbon containing substance.

Conversely, using similar parameters to those described above in Example 1, but injecting the methane with an injection velocity below 60 m/s STP using a single-hole nozzle, a significant fraction of carbon nodules and spheroidal carbon particles were produced leading to the typical Raman spectrum of acetylene black (as shown in FIG. 3). FIG. 5 illustrates the ICP torch 200 used in this counter example as well as the qualitative flow of the gases including the non-carbon containing gases and the carbon containing substance.

In this example, and as shown in FIG. 5, an injection velocity of 28.6 m/s STP was used. The carbon precursor gas feed rate was 34.7 slpm CH4, and the achieved production rate was 142 g/h. 20 slpm argon is used as central swirl gas 228, surrounded by a layer of quench gas (sheath gas) 224 consisting of 125 slpm of argon and 8 slpm of hydrogen gas. Otherwise the same method and apparatus were used as in Example 1. The carbon precursor gas 220 was injected through the injector probe without the designed nozzle 210 (e.g. with a single-hole nozzle). Coils 222 conducting the radio frequency alternating current generate the plasma. Qualitative isotherm lines 226 are shown inside the plasma torch.

The graphene nanosheets produced using these parameters contained between 0.7 and 1.2 percent by weight of polyaromatic hydrocarbons (PAH) (as measured by Soxhlet extraction with toluene). The resulting material presents a low specific surface area (B.E.T.) of 150 m$^2$/g and a Raman spectra characteristic of thick graphitic nodules instead of thin graphenic particles (FIG. 3). The resulting particles display a Raman G/D ratio of 1.1 and a 2D/G ratio of 0.5 when measured using an incident wavelength of 514 nm. As illustrated in FIG. 5, the carbon precursor is injected into the hot zone via a single-hole probe without a designed nozzle, thus leading to a longer residence time in the hot zone, poor quenching efficiency and as a consequence the formation of acetylene-type carbon black (e.g. not graphene). The carbon precursor gas is injected at an angle of zero degrees with respect to the axis of symmetry of the plasma.

The embodiments of the paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the embodiments of any paragraphs and the processes of the SUMMARY are hereby covered by the present disclosure.

The scope of the claims should not be limited by specific embodiments and examples provided in the disclosure, but should be given the broadest interpretation consistent with the disclosure as a whole.

REFERENCES

Zhiyong Wang, Nan Li, Zujin Shi and Zhennan Gu., Low-cost and large-scale synthesis of graphene nanosheets by arc discharge in air. Nanotechnology 21 (2010) 175602.

Haibao Zhang, Tengfei Cao, Yi Cheng, Preparation of few-layer graphene nanosheets by radio-frequency induction thermal plasma. Carbon 86 (2015) pp. 38-45.

Ravil Amirov, Marina Shavelkina, Nariman Alihanov, Evgeny Shkolnikov, Alexander Tyuftyaev, and Natalya Vorob'eva. Direct Synthesis of Porous Multilayer Graphene Materials Using Thermal Plasma at Low Pressure. Journal of Nanomaterials (2015) Article ID 724508.

R Pristavita, N Y Mendoza-Gonzalez, J L Meunier, D Berk, Plasma Chemistry and Plasma Processing 30 (2010) No 2, 267.

Ramona Pristavita, Norma-Yadira Mendoza-Gonzalez, Jean-Luc Meunier, Dimitrios Berk, Plasma Chemistry and Plasma Processing 31 (2011) No 2, 393.

Production de carbone par pyrolyse du methane dans un plasma thermique (Masters Thesis of Emmanuel Bergeron; University of Sherbrooke, 1997).

Synthèse de noir de carbone à partir de propane, utilisant un plasma thermique (Masters Thesis of Martin Lavoie, University of Sherbrooke 1997).

Stephen Brunauer, P. H. Emmett, Edward Teller, The Journal of the American Chemical Society 60 (1938) 309.

E. W. Lemmon and R. T Jacobsen, International Journal of Thermophysics, Vol. 25 (2004) 21-68.

What is claimed is:

1. A plasma process for producing graphene nanosheets, comprising:
    injecting a carbon-containing substance through an injection nozzle of a plasma torch at a velocity of at least 60 m/s into a thermal zone of a plasma and with a supplied plasma torch power greater than 35 kW, thereby producing said graphene nanosheets at a rate of at least 80 g/h,
    wherein said graphene nanosheets have a polyaromatic hydrocarbon concentration of less than about 0.7% by weight, and
    wherein a quench gas is injected inside said plasma torch and separately from said carbon-containing substance.

2. A plasma process for producing graphene nanosheets, comprising:
    generating an inert gas plasma comprising a thermal zone, said plasma consisting of ionized inert gas;
    injecting a carbon-containing substance through an injection nozzle at a velocity of at least 60 m/s into said thermal zone of said plasma, thereby producing said graphene nanosheets at a rate of at least 2 g/kWh of supplied plasma torch power,
    wherein said graphene nanosheets have a polyaromatic hydrocarbon concentration of less than about 0.7% by weight.

3. The process of claim 2, wherein said graphene nanosheets are quenched with a quench gas fed at a rate of at least 3 slpm of said quench gas per kW of supplied torch power.

4. The process of claim 2, wherein said graphene nanosheets are quenched with a quench gas fed at a rate of about 0.5 slpm to about 1.5 slpm of said quench gas per kW of supplied torch power.

5. The process of claim 2, wherein said graphene nanosheets are quenched with a quench gas having a temperature below 900° C.

6. The process of claim 5, wherein said carbon-containing substance is injected at a quench gas to carbon ratio of about 100 slpm to about 250 slpm of said quench gas per mole of carbon per minute.

7. A plasma process for producing graphene nanosheets, comprising:
    generating an inert gas plasma comprising a thermal zone, said plasma consisting of ionized inert gas;
    injecting a carbon-containing substance through an injection nozzle at a velocity of at least 60 m/s STP into said thermal zone of said plasma, and at a quench gas to supplied plasma torch power ratio of at least 1.25 slpm of quench gas per kW of supplied plasma torch power, thereby producing said graphene nanosheets,
    wherein said graphene nanosheets have a polyaromatic hydrocarbon concentration of less than about 0.7% by weight.

8. The process of claim 7, wherein said graphene nanosheets have a polyaromatic hydrocarbon concentration of about 0.01% to less than about 0.5% by weight.

9. The process of claim 7, wherein said graphene nanosheets have a polyaromatic hydrocarbon concentration of about 0.1% to less than about 0.3% by weight.

10. The process of claim 7, wherein said graphene nanosheets are quenched with a quench gas having a temperature below 1300° C.

11. The process of claim 7, wherein said graphene nanosheets are quenched with a quench gas having a temperature below 100° C.

12. The process of claim 7, wherein said carbon-containing substance is injected at a quench gas to carbon ratio of at least 160 slpm of quench gas per mole of carbon per minute.

13. The process of claim 7, wherein said carbon-containing substance is injected at a quench gas to carbon ratio of at least 250 slpm of quench gas per mole of carbon per minute.

14. The process of claim 7, wherein said graphene nanosheets are produced at a rate of about 120 to about 150 g/h.

15. The process of claim 7, wherein said graphene nanosheets are produced at a rate of about 150 to about 250 g/h.

16. The process of claim 7, wherein said carbon-containing gas is a $C_1$-$C_4$ hydrocarbon.

17. The process of claim 7, wherein said carbon-containing substance is methane or natural gas.

18. The process of claim 7, wherein said quench gas is fed at a rate of 1 to 10 slpm of gas for each kW of supplied plasma torch power.

19. The process of claim 7, wherein said supplied plasma torch power is greater than 100 kW.

20. The process of claim 7, wherein an injection angle of the carbon-containing substance is about 15 to about 35 degrees with respect to the axis of symmetry of the plasma.

21. The process of claim 7, wherein said process is carried out using a plasma torch comprising multi-hole injector for injecting the carbon-containing substance, wherein for each of injector holes, injection velocity is at least 60 m/s STP and injection angle is about 15 to about 35 degrees with respect to the axis of symmetry of the plasma.

22. The process of claim 7, wherein said graphene nanosheets are quenched with a quench gas fed at a rate of about 1.5 slpm to about 4 slpm of said quench gas per kW of supplied torch power.

23. The process of claim 22, wherein said quench gas comprises argon.

24. The process of claim 7, wherein said carbon-containing substance is injected at a velocity of about 60 to about 100 m/s STP.

25. The process of claim 24, wherein said supplied plasma torch power is greater than 200 kW.

* * * * *